(12) United States Patent  (10) Patent No.: US 8,141,638 B2
Tulissi et al.  (45) Date of Patent: Mar. 27, 2012

(54) FRACTURING METHOD AND APPARATUS UTILIZING GELLED ISOLATION FLUID

(75) Inventors: Michael G. Tulissi, Dewington (CA); Samuel Luk, Calgary (CA); Jason Vaughan, Calgary (CA); David J. Browne, Calgary (CA); Dale Dusterhoft, Redwood Meadows (CA)

(73) Assignee: Trican Well Services Ltd., Calgary (CA)

( * ) Notice: Subject to any disclaimer, the term of this patent is extended or adjusted under 35 U.S.C. 154(b) by 306 days.

(21) Appl. No.: 12/529,661

(22) PCT Filed: Feb. 28, 2008

(86) PCT No.: PCT/CA2008/000370
§ 371 (c)(1),
(2), (4) Date: Sep. 10, 2009

(87) PCT Pub. No.: WO2008/106767
PCT Pub. Date: Sep. 12, 2008

(65) Prior Publication Data
US 2010/0084134 A1  Apr. 8, 2010

(30) Foreign Application Priority Data
Mar. 2, 2007 (CA) .................................. 2580590

(51) Int. Cl.
*E21B 33/134* (2006.01)
*E21B 33/138* (2006.01)
*E21B 43/25* (2006.01)
*E21B 43/26* (2006.01)

(52) U.S. Cl. ....... 166/281; 166/50; 166/177.5; 166/294; 166/300; 166/305.1; 166/307; 166/308.1; 507/211; 507/216; 507/925

(58) Field of Classification Search .................. None
See application file for complete search history.

(56) References Cited

U.S. PATENT DOCUMENTS

| | | |
|---|---|---|
| 4,265,311 A | 5/1981 | Ely |
| 4,333,461 A | 6/1982 | Muller |
| 4,537,700 A | 8/1985 | Purinton, Jr. |
| 4,759,579 A | 7/1988 | Swanson |
| 4,817,719 A | 4/1989 | Jennings |
| 4,819,726 A | 4/1989 | Beirute et al. |
| 4,951,751 A | 8/1990 | Jennings |

(Continued)

FOREIGN PATENT DOCUMENTS
CA  2104138 A1  3/1994
(Continued)

OTHER PUBLICATIONS

Kachmar, J.D., "Separation of wellbore by polycondensing pseudoplastic fluid," book excerpt, Moscow, 1982, pp. 1-3, 29-30.

(Continued)

*Primary Examiner* — George Suchfield
(74) *Attorney, Agent, or Firm* — Nicholas Landau; Nathan Johnson; Bradley Arant Boult Cummings LLP (57) ABSTRACT

A method and apparatus for fracturing a formation containing a wellbore comprising the steps of (a) injecting a gel into the wellbore; (b) permitting the gel to increase in viscosity and (c) fracturing the formation in the vicinity of the gel.

27 Claims, 9 Drawing Sheets

U.S. PATENT DOCUMENTS

| | | | |
|---|---|---|---|
| 5,273,115 A * | 12/1993 | Spafford | 166/281 |
| 5,314,020 A * | 5/1994 | Jennings et al. | 166/281 |
| 5,361,856 A | 11/1994 | Surjaatmadja | |
| 5,494,103 A | 2/1996 | Surjaatmadja | |
| 5,765,642 A | 6/1998 | Surjaatmadja | |
| 5,846,915 A * | 12/1998 | Smith et al. | 507/269 |
| 6,257,335 B1 * | 7/2001 | Nguyen et al. | 166/280.2 |
| 6,543,538 B2 | 4/2003 | Tolman et al. | |
| 7,159,660 B2 | 1/2007 | Justus | |
| 7,183,239 B2 | 2/2007 | Smith et al. | |
| 7,225,869 B2 | 6/2007 | Willett et al. | |
| 7,398,825 B2 * | 7/2008 | Nguyen et al. | 166/280.1 |
| 2006/0000610 A1 * | 1/2006 | Farabee et al. | 166/281 |
| 2006/0124309 A1 * | 6/2006 | Nguyen et al. | 166/308.2 |
| 2007/0070020 A1 * | 3/2007 | Edo et al. | 345/100 |
| 2008/0078548 A1 * | 4/2008 | Pauls et al. | 166/280.1 |

FOREIGN PATENT DOCUMENTS

| | | |
|---|---|---|
| CA | 2130365 A1 | 3/1995 |
| CA | 2225571 | 6/1998 |
| RU | 2177541 C2 | 12/2001 |
| RU | 2180039 C2 | 2/2002 |
| RU | 2190762 C2 | 10/2002 |
| RU | 2191259 C2 | 10/2002 |
| RU | 2224773 C2 | 2/2004 |
| RU | 2256787 C1 | 7/2005 |
| RU | 2280762 C1 | 7/2006 |
| WO | 02-06629 A1 | 1/2002 |
| WO | 2005/090747 | 9/2005 |
| WO | WO 2006/103637 | 5/2006 |

OTHER PUBLICATIONS

Official Russian Action.

* cited by examiner

FRACTURING METHOD AND APPARATUS UTILIZING GELLED ISOLATION FLUID

CROSS-REFERENCE TO RELATED APPLICATIONS

This application claims priority from Canadian Patent Application Serial No. 2,580,590 filed Mar. 2, 2007. This Application is a U.S. National Stage of PCT/CA08/000370 filed Feb. 28, 2008.

MICROFICHE APPENDIX

Not applicable.

FIELD OF INVENTION

This invention relates to fracturing of subterranean formations in general and the isolation of a formation during fracturing in particular.

BACKGROUND OF THE INVENTION

Isolation of Horizontal Wells

Many wells are drilled horizontally into subterranean formations. On occasion, it is desired to create a number of hydraulic fractures along the length of these horizontal wells. When creating multiple fractures, it is important to be able to isolate one fracture from another so the same part of the well is not repeatedly fractured.

A number of methods have been used to isolate fractures. In one such method, steel pipe (liner) is cemented in the well and then perforated. The liner is first perforated at a first location. A hydraulic fracturing treatment is then performed at this location. After the fracturing treatment, a mechanically set plug (bridge plug) is set inside the casing above the fractured area and a new set of perforations are shot closer to the heel of the well. A second fracturing treatment is then performed at the location of the new set of perforations. The procedure is then repeated along the length of the horizontal section of the liner resulting in a number of perforating and fracturing treatments being completed in the well. While effective at providing isolation between the fractures, this procedure is costly and time consuming.

Another isolation method involves cementing a liner in a horizontal well and perforating the liner at all of the intervals along the well where fracturing is to be performed. An isolation packer assembly is then run on tubing to isolate the various intervals from each other. Fracturing is performed at a perforated interval with the packer cups bounding the area of the fracture. The isolation packer is then pulled up the hole and a fracturing treatment is performed on each perforated interval.

Another isolation method involves leaving the well in an open hole state with no liner or casing in place. In this situation, inflatable packers or other mechanical tools are run in the well to isolate one part of the horizontal well from another. Various fracturing treatments are performed in these isolated intervals between the packers or other tools. Such treatments are performed through tubing.

Another isolation method involves isolating the well with a number of packers and sliding sleeves which are originally run into the well with all the sleeves closed except for the interval closest to the toe of the horizontal well. A fracturing treatment is pumped through this open sleeve. After the treatment, a ball is pumped down the well to isolate the sleeve across the interval that was just fractured and to open a sleeve on a new interval that is closer to the heel of the well. A second fracturing treatment is then pumped into this newly isolated interval. This procedure is repeated on all of the sleeves until all of the intervals in the well have been stimulated.

Another isolation method involves initiating a cut in the formation using a jetting nozzle and sand run on the end of tubing. This cut is immediately followed by a fracturing treatment pumped through the same jetting nozzle or down the annulus of the tubing and the steel casing. This method relies on a negative pressure drop created by the jetting nozzle to divert the fracturing treatment into the cut that was just created in the formation. The tubing is then moved to a new location in the horizontal section of the well. The procedure is repeated. This procedure can be used with tools run on tubing or coiled tubing and can be in cased or open hole. Such methods are described in Canadian Patents 2225571, 2130365, 2104138 and U.S. Pat. Nos. 5,361,856, 5,494,103, 5,765,642 and 7,159,660.

Another method, described in U.S. Pat. No. 4,951,751, involves a method of diverting fracturing treatments in cased wells that are cemented and perforated. In this method, a well is perforated at the farthest desired location from the heel and a fracturing treatment is performed. The fracturing treatment is followed by a solidifiable gel containing a breaker and a solid mechanical wiper plug of rubber, metal, wood, etc. The wiper plug is similar to a pipeline plug. The gel and wiper plug is displaced across the first fracturing treatment and the gel is allowed time to solidify. The well is then perforated again at a location closer to the heel and a second fracturing treatment is performed in a similar manner. The solid wiper plug and the gel both work to divert the fracturing treatment away from the first fracturing treatment. The lack of perforations towards the heel of the fracture ensures diversion of the fracturing treatment above the perforated interval. In this method, the fracturing treatments are pumped directly down the casing with no tubing or coiled tubing in place.

Many wells are drilled vertically or at an angle from vertical (deviated) but are not horizontal. In many of these wells, a number of subterranean formations are present that require hydraulic fracturing treatments. In these wells, it is often desirable to fracture each subterranean formation separately. To do this, a number of methods have been developed to isolate one formation from another.

One such method is to perforate all of the desired intervals and isolate the formations by using a combination of packers and bridge plugs. A subterranean formation is isolated between these mechanical plugs and a fracturing treatment is performed. The plugs and packer are then moved to the next interval and a second fracturing treatment is performed. This procedure is repeated on each formation that needs to be fractured moving up the well until all have been done. In this procedure, the fracturing treatments are normally pumped down tubing but can also be pumped down coiled tubing. The method can also be applied by pumping fracturing treatments down the casing with bridge plugs in place, with no perforations above the interval to be fractured and no packer.

Another method uses rubber cups run on coiled tubing in a perforated cased well. The rubber cups seal to the casing when pressure is applied from the inside and a fracturing treatment is pumped into a formation that is isolated between the cups. When the treatment is completed the pressure is released and the cups relax. The cups are then moved to the next formation and the procedure is repeated. This method is normally used when the fracturing treatment is pumped through coiled tubing but can also be used on regular tubing.

Another method involves a perforation strategy, and on occasion, ball sealers to divert the fracturing treatment into different formations. This method, often known as limited entry fracturing is normally used when the fracturing treatment is pumped directly down the casing with no tubing in the wellbore.

SUMMARY

According to one aspect, the invention relates to a method of fracturing a formation containing a wellbore comprising the steps of (a) injecting a gel into the wellbore, and (b) fracturing the formation adjacent the area of the gel.

According to another aspect, the invention relates to a method of fracturing a formation containing a wellbore comprising the steps of (a) inserting tubing into the wellbore to a first location; and (c) introducing a fracturing fluid into the wellbore via the tubing to fracture the formation at the first location.

According to another aspect, the invention relates to a bottomhole apparatus for introducing a fluid into a wellbore comprising a tube including a first end connectable to tubing and a second end which is closed, the tube including a least one slot in the side thereof, whereby fluid entering the apparatus from the first end is directed out the side of the tube. The slot can be elongated. The bottomhole apparatus can have a cone at the second end adapted to laterally deflect fluid out of the apparatus. There can also be means for coupling the apparatus to the tubing.

BRIEF DESCRIPTION OF THE DRAWINGS

The invention is described below with reference to the accompanying drawings, and wherein.

DETAILED DESCRIPTION

Figure 1:
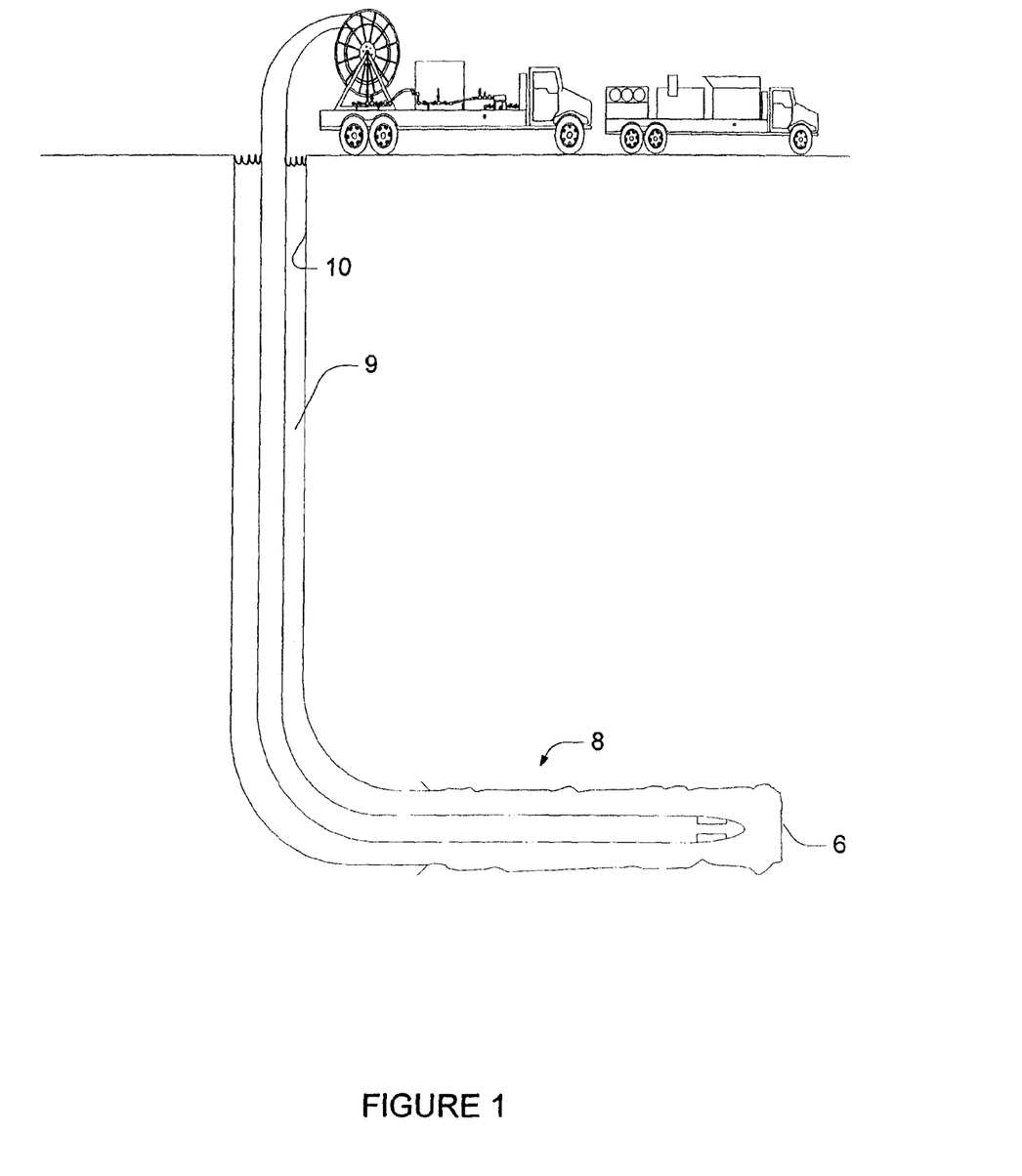
FIG. 1 is a schematic representation of coiled tubing or tubing inside a horizontal wellbore.

With reference initially to FIG. 1, in one embodiment of the invention, wellbore jointed tubing or coiled tubing 2 (see FIG. 2) is run into a well casing 10 and an open hole formation 8 below this casing to a depth where the first fracturing treatment is to be initiated. In a vertical well this will be at the formation nearest the bottom of the well. In a horizontal well this will be at a location closest to the toe 6 of the horizontal section indicated generally at 8 of the well. After the tubing 2 has been placed at the desired location, the wellbore 10, if not already full, is filled with an annulus fluid 9 which may be water, a hydrocarbon fluid, or any suitable fluid that can fill the wellbore 10. This fluid is incompressible and has no viscosity increasing chemicals added to it.

Figure 2:
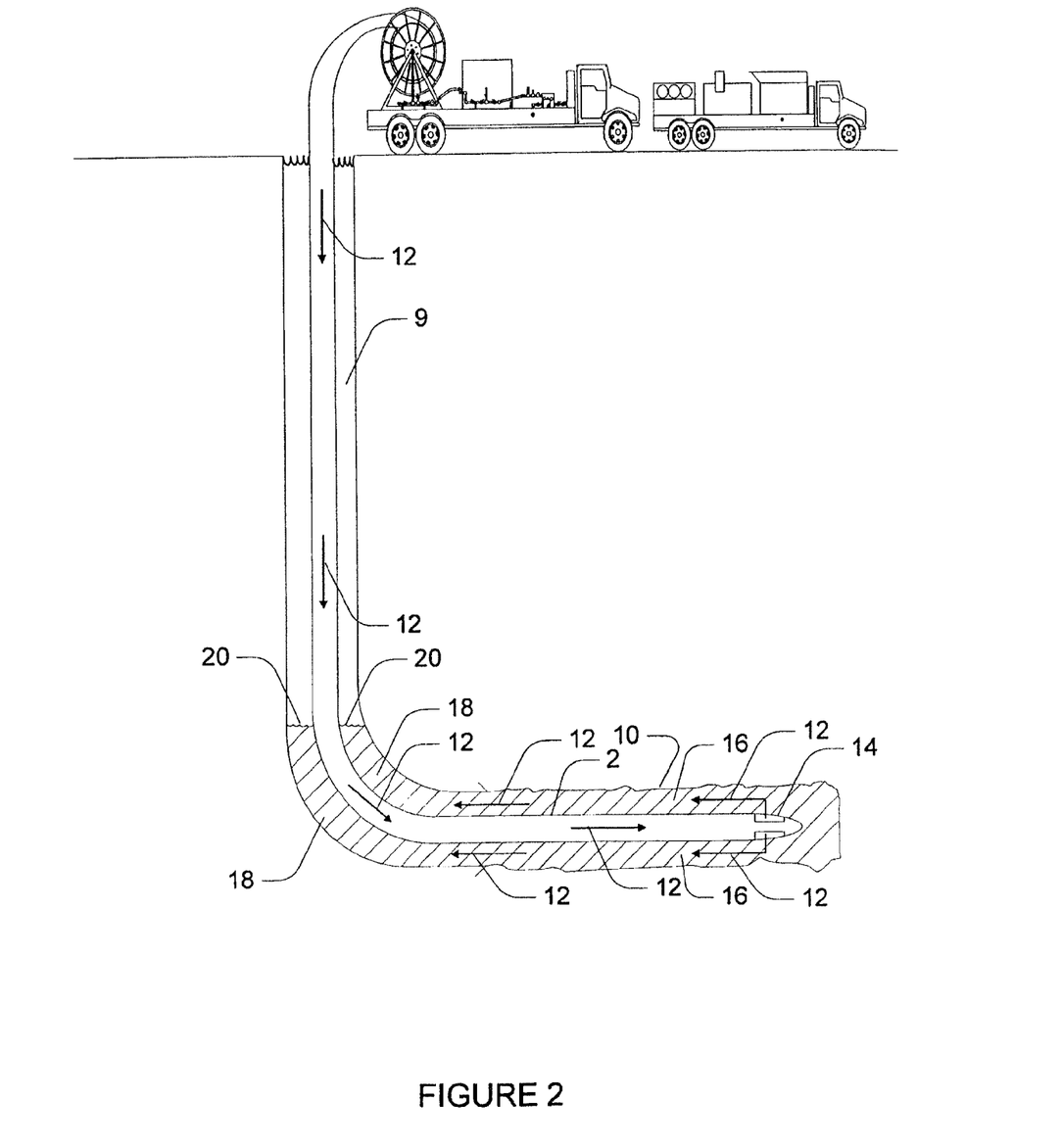
FIG. 2 is a schematic representation of a gel according to the invention being introduced into the wellbore of FIG. 1.

After the wellbore 10 is filled with the annulus fluid, the entire wellbore 10 or a part thereof, is filled with a viscous gel 12 by circulating the gel 12 down the tubing 2 and out through a bottomhole apparatus diverting tool 14 as shown in FIG. 2. The gel 12 displaces the annulus fluid 9 previously placed in the well 10. After introduction of the gel 12 into the wellbore 10, the viscosity of the gel 12 increases over time (typically about a half an hour) to a maximum viscosity and forms a gel plug 18 in the wellbore 10. In the embodiment of FIG. 2, the wellbore is filled with gel to a level indicated by 20. The gel plug 18 does not solidify and permits the tubing 2 to pass through it.

Figure 3:
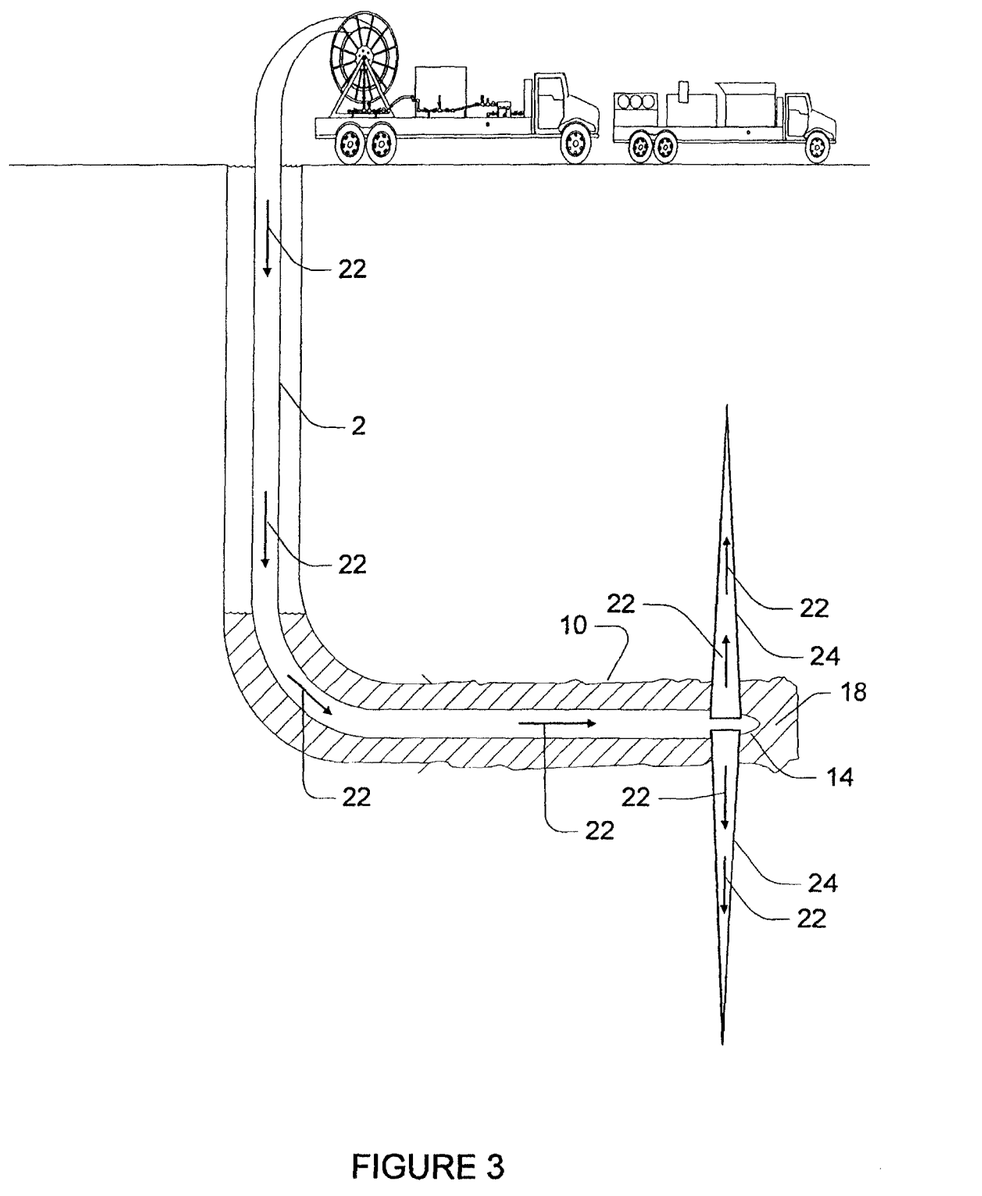
FIG. 3 is a schematic representation of a first fracture in the formation of FIG. 1.

Referencing to FIG. 3, following the formation of the gel plug 18, a fracturing fluid 22 (or other suitable stimulation fluid) is pumped down the tubing 2 and is directed laterally against the formation. The fracturing fluid 22 displaces an amount of the plug 18 away from the formation face and then initiates a fracture into the subterranean formation.

Figure 8:
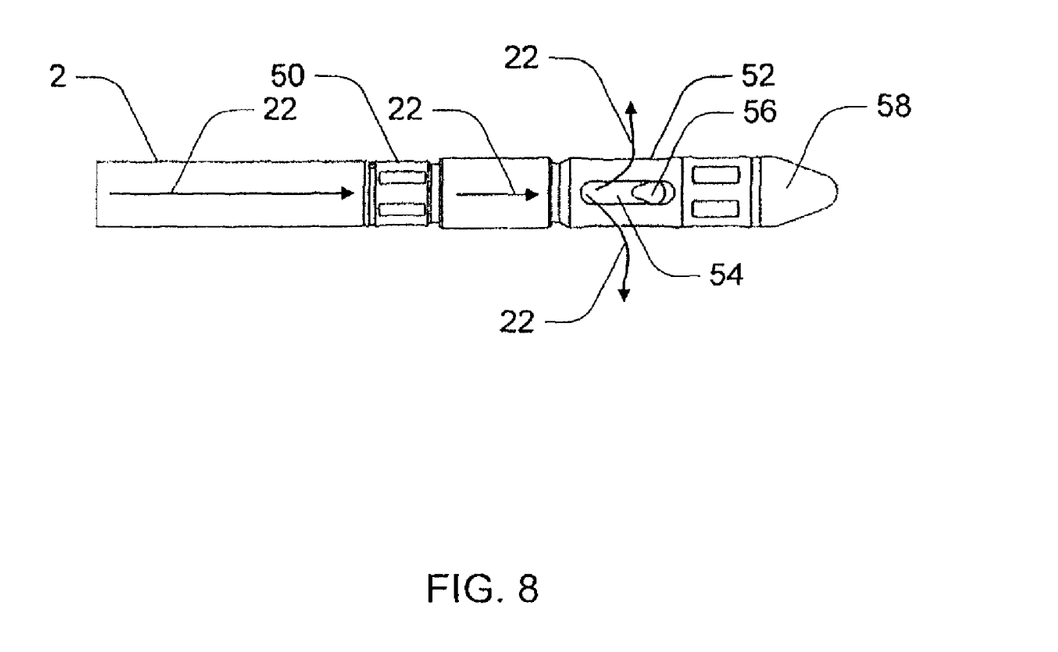
FIG. 8 is a schematic representation of a diverting tool usable in a method according to the invention.
Figure 9:
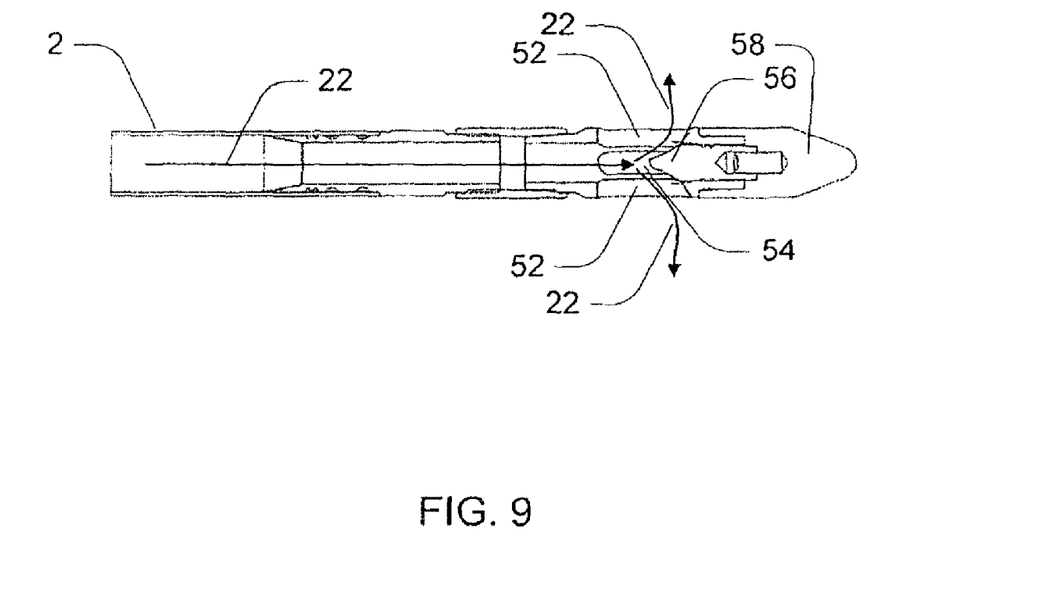
FIG. 9 is a cross section of the tool of FIG. 8.

Referring to FIGS. 8 and 9, diverting tool 14 (see FIG. 2) is connected to the end of the tubing 2 by tubing connector 50 to divert the fracturing treatment 22 in a direction generally perpendicular to the longitudinal axis for the tool 14, rather than out the end of the tubing 2, thus initiating a fracture adjacent to the side of the tool 14. The structure of the flow diverter 52 diverts flow from the middle of the tubing 2 and directs it tangentially out the sides of the tool 14 through slots 54. The slots 54 are designed with sufficient flow area so as not to impede the flow of the fluid. The tool 14 does not create a pressure drop nor does it cause any jetting action on the formation itself. The tool uses a solid cone 56 to deflect the fluid tangentially. The end of the tool has a rounded bullnose 58 to allow the tool to be easily pushed into the well. The tool 14 is not essential to but improves the ability of the fracturing fluid to be directed against the formation during the fracturing treatment.

The annulus pressure is normally monitored at the surface during the fracturing treatment. Pressure may be increased in the annulus to help keep the gel plug 18 in place or the hydrostatic pressure of the annulus fluid 9 (see FIG. 2) may also perform this purpose.

The rheological properties of the gel are such that migration of the fracturing fluid 22 along the wellbore 10 away from the area of the fracture 24 is minimized due to the yield strength of the gel. Fractures created by the fracturing treatment are thus contained or isolated by the gel plug 18 to the area of the tool 14.

Figure 4:
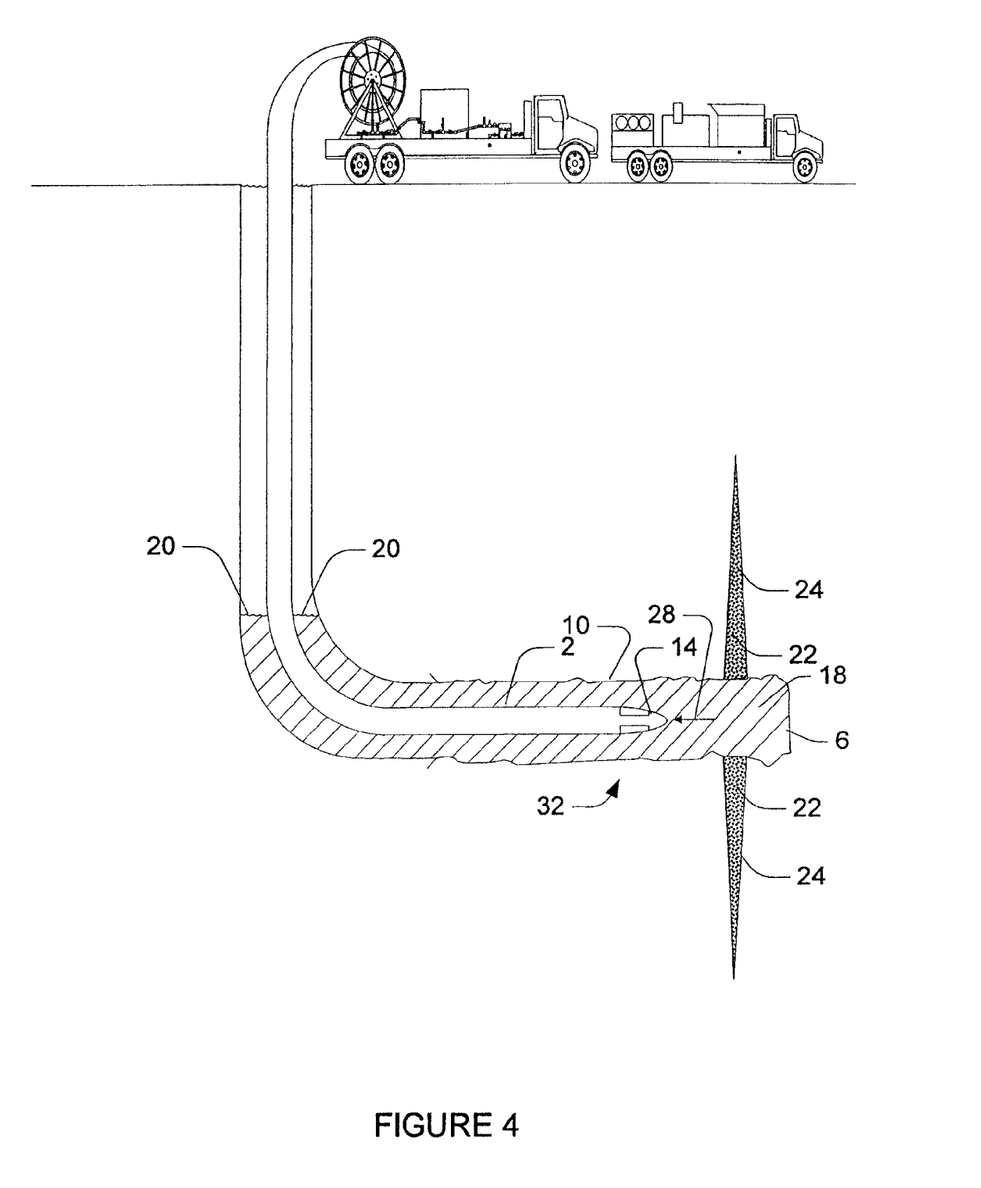
FIG. 4 is a schematic representation of the coiled tubing or tubing of FIG. 1 pulled back to a second fracturing interval according to the invention.
Figure 5:
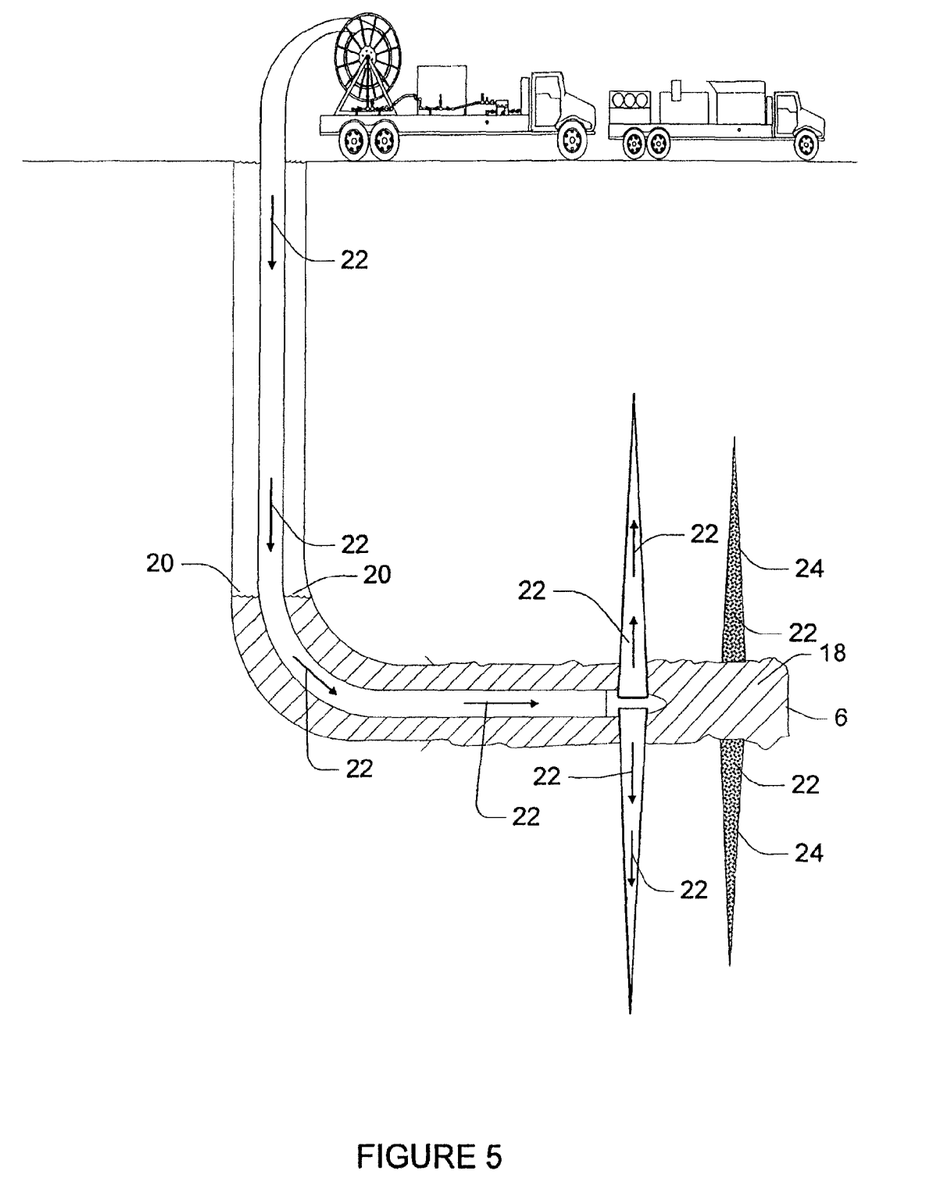
FIG. 5 is a schematic representation of a second fracture at the second fracturing interval of FIG. 1.

A fracture 24 adjacent the tool 14 is shown in FIG. 3. After the first fracturing treatment is completed, the tubing 2 is pulled back through the gel plug 18 in the direction of arrow 28 as shown in FIG. 4 towards the heel indicated generally at 20 of the wellbore 10. If required, additional gel 12 (see FIG. 2) may be circulated into the wellbore 10 while and/or after the tubing 2 is pulled back to the next interval or location indicated generally at 32 in the formation, where the next fracturing treatment is to be performed. The previously described fracturing method can then be performed to create a second fracture in the area of location 32 (see FIG. 4) as shown in FIG. 5.

Figure 6:
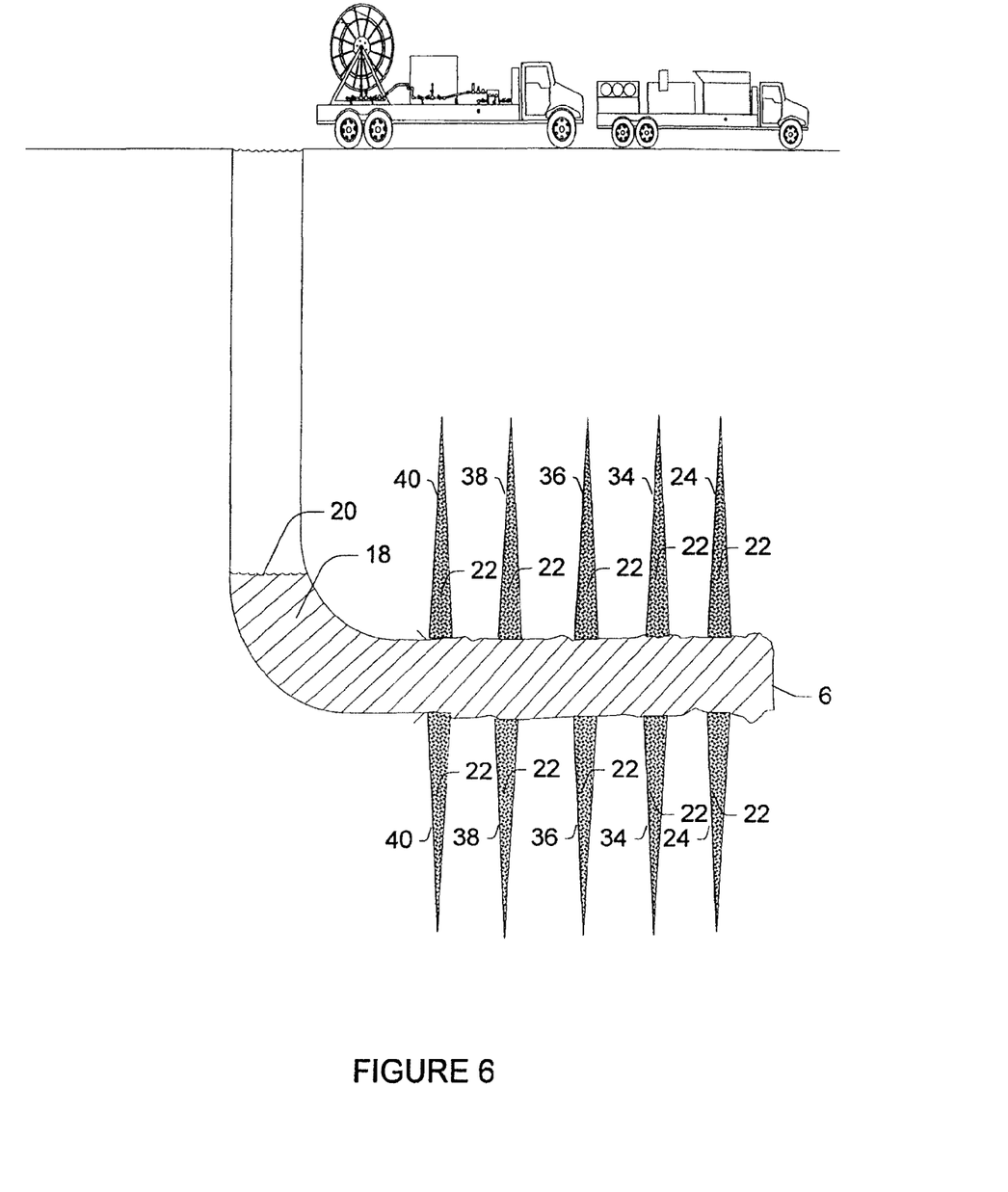
FIG. 6 is a schematic representation of the wellbore of FIG. 1 with the tubing removed and fracturing completed.
Figure 7:
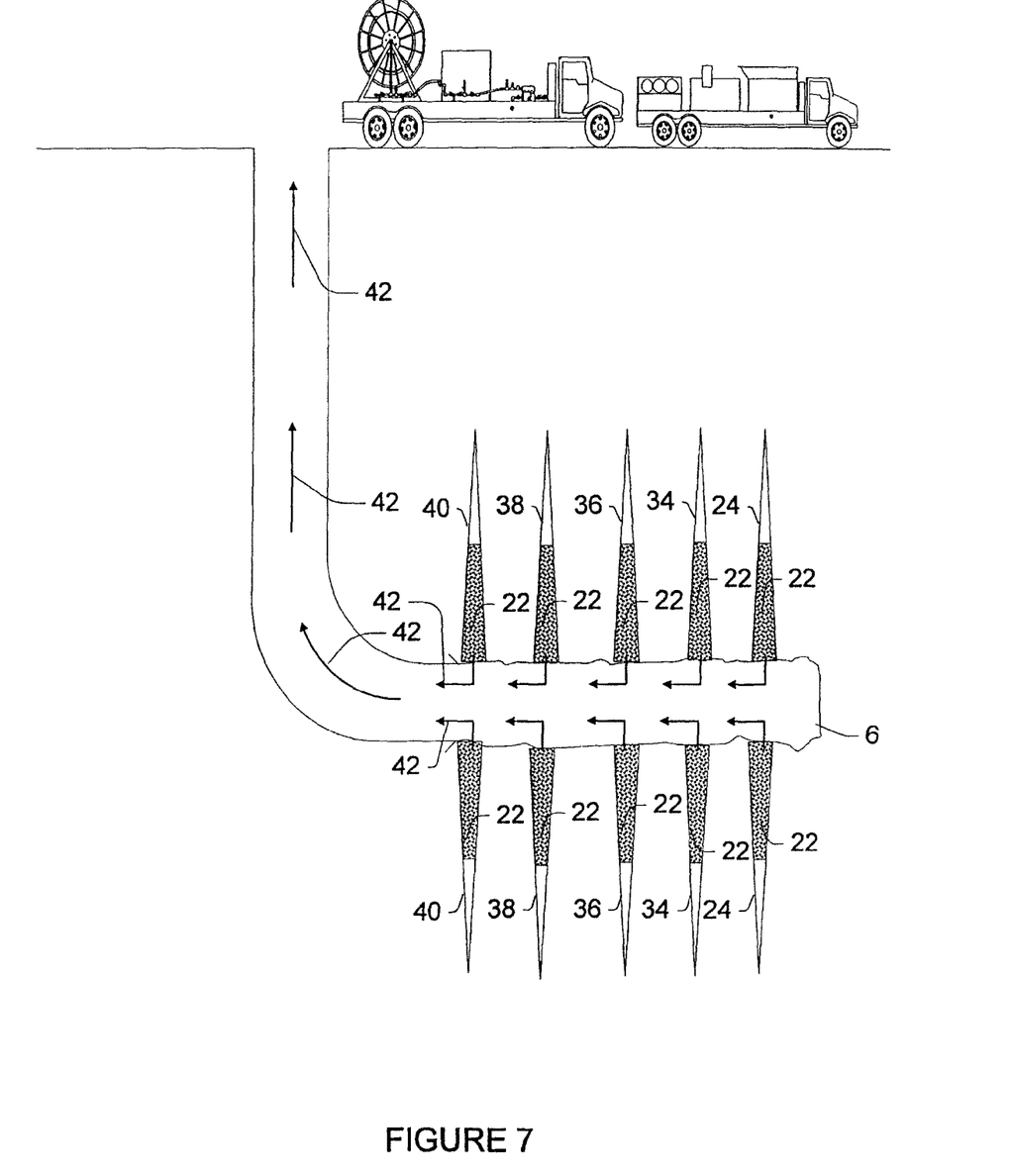
FIG. 7 is a schematic representation of the wellbore of FIG. 1 being flowed back following breaking of the gel plug according to the invention.

This method can be repeated as many times as required in the wellbore 10 (see FIG. 3). In FIG. 6, five fractures are shown. After all of the desired fracturing treatments have been performed, the tubing 2 is pulled from the wellbore 10 leaving behind the gel plug 18 and the fractures 24, 34, 36, 38 and 40, wherein the fractures 24, 34, 36, 38 and 40 contain fracturing fluid 22. After the elapse of a sufficient amount of time, a gel breaker contained in the gel 12 (see FIG. 2) causes the viscosity of the gel plug 18 to degrade (break). Once the viscosity degrades to a suitable amount, the well can be flowed back to surface together with the fracturing fluid 22 and oil and gas (not shown) from the formation in the direction indicated by arrows 42 in FIG. 7. The well is normally flowed back the day after fracturing is carried out but can be flowed back as soon as the 12 gel breaks which can occur a few hours after the fracturing treatment. Alternately a chemical breaker may be circulated through the tubing 2 into the wellbore 10 after the final fracture treatment to accelerate the degradation of the gel plug 18 (see FIG. 3).

The method described above can also be used when stimulating a formation below fracturing pressure which is commonly known as a matrix stimulation. In matrix stimulations, it is desirable to isolate and inject stimulation fluid at different intervals in a wellbore, to for example, stimulate different formations. Stimulation fluid is injected below normal fracturing pressure. The fracturing fluid is diverted into the desired part of the well using the same general method as is described above. A gel plug isolates a certain part of the wellbore and prevents the stimulation fluid from moving to a different part of the well during the treatment. Injected fluids can be acid, water, hydrocarbons, solvents, chemical formulations, alcohols, nitrogen, carbon dioxide, natural gas and any other fluid that needs to be confined to a particular area of the wellbore and is designed to stimulate the reservoir.

Gel plugs according to the invention are designed not to leak into the formation or into any fractures in the formation. The plug is also designed to have a sufficient yield stress that when combined with hydrostatic or applied annulus pressure, it will withstand the pressure exerted on it by the fracturing treatment or stimulation. This yield stress is designed to be low enough to allow the fracturing fluid to displace it slightly at the point of initiation so that the fracturing fluid can create a hydraulic fracturing in the rock, and be high enough to prevent the fracturing fluid from moving to another part of the wellbore. The required yield stress of the gel will vary from well to well depending on the characteristics of the well, formation, fracturing fluid and the pressure that the fracturing treatment will create in the wellbore. In each case, calculations are made prior to performing the treatment to determine the pressure that will be created at the point where the fracture or stimulation fluid injection is at the wellbore. Calculations are then made to determine the yield stress of the gel required to withstand this pressure adjacent to the formation and to ensure that the stimulation will only enter at the targeted point.

Fracturing pressure can be calculated using equation (1)

$$BHFP = FG \times Depth \text{ equation} \qquad Eq(1)$$

where FG=fracturing gradient of the formation known from experience

Depth=depth of the well

BHFP=bottom hole fracturing pressure

Calculation to determine Differential Pressure Resistance of a gel plug according to the invention can be made using equations (2) and (3)

$$\Delta P = 4L\tau_{yield}/D \qquad Eq(2)$$

In concentric circular conduits $$\Delta P = 2(r_o - r_i)L\tau_{yield}/(r_o^2 - r_i^2) \qquad Eq(3)$$

where $\tau_{yield}$=Yield Stress of Gel
L=Length of gel plug
D=Diameter of conduit
$r_o$=Internal radius of outer conduit
$r_i$=External radius of inner conduit Units of measurement are in consistent units of length and Pressure $\tau_{yield}$ may be measured in the lab.

Differential pressure resistance may be calculated for a given length along the well or across openings in the formation such as previously induced fractures, pre-existing fractures or faults, natural fractures, and pore openings in the formation.

One or more of the following variables may need to be taken into account when designing the gel plug.

The hole or inside casing diameter.
The temperature of the well.
The permeability and leakoff characteristics of the well.
The permeability, conductivity, and leakoff characteristics of the previously created fractures.
The geology, natural fractures, and faults in the formation.
The compatibility of the plug with wellbore and stimulation fluids to ensure that the plug does not damage the well or react with stimulation fluids.
The yield stress (or yield strength) of the gel plug.
The differential pressure resistance of the gel plug.
The annulus or hydrostatic pressure required to keep the plug in place.

The gel includes a base fluid which can be an aqueous-based fluid, a hydrocarbon-based fluid or is any other fluid in which sufficient viscosity and yield stress can be created and subsequently reduced. The gel also includes a viscosifying agent which can be any chemical or substance that creates viscosity and static yield stress in a liquid. Normal viscosifying chemicals for water, alcohols and acids that are used are guar or guar derivatives, hydroxyl ethyl cellulose or derivatives, viscoelastic surfactants, and any other polymer that will viscosify the water. Normal viscosifying materials for hydrocarbons are phosphate esters crosslinked with iron or aluminium. Aluminium octoate can also be used as a viscosifying agent.

Crosslinking chemicals in aqueous fluids can be any multivalent metal ion, such as borate, antimony, zirconium, chrome, titanium and iron. They are added to the gels to increase the viscosity and yield stress of the plug. Surfactants, clay stabilizers, salt, methanol, pH adjusters, biocide and flowback enhancers can all be added to the water to improve flowback of the fluids or to ensure chemical and physical compatibility with the formation and formation fluids, however these additives are not employed to create the yield stress in the plug.

A breaker is added to the gel which causes the gel to degrade (break) over a period of time leaving a very low viscosity fluid in the well that will flow out of the well after the stimulation treatments are performed. The gel plug is designed such that its viscosity is maintained at a suitable level while the stimulation treatments are performed and degrades after a given period which normally is after the last treatment is completed.

The breaker can be any chemical that reduces the viscosity of the gel over time. Common breakers for water, alcohol or acid plugs are enzymes or oxidizers such as persulfates, peroxides, acids or bleach. Common breakers for hydrocarbon plugs are pH buffers or caustic fluids. The breaker can cause the gel to break at any time from minutes to days depending on what is required to complete the well.

Surfactants, clay stabilizers, salt, methanol, pH adjusters, brocide and flowback enhancers can be added to the base fluid to improve flowback of the fluids or to reduce damage to the formation but are not added to viscosify the gel.

EXAMPLES

An example of a water based gel plug according to the invention includes the following components.

| | |
|---|---|
| Base: | Fluid Fresh Water |
| Gellant: | Guar, Hydroxypropyl Guar or Carboxymethyl hydroxypropyl guar, or Hydroxy ethyl Cellulose at 3 6 to 10 0 kg/m³ |
| Breaker: | Persulfate run at 005 to 2 0kg/m³ with or without encapsulation. |
| Surfactant: | Non-emulsifier, surface tension reducing and flow back enhancer run between 0.5 to 5 L/m³ |
| Clay Stabilizer: | Either KCL at 1 0 to 10% or an amine based product such as TMAC or DADMAC at 0.5 to 10.0 L/m³ |
| Crosslinker: | Borate or Zirconium solutions at concentrations from 1.0-10.0 L/m³ |

The clay stabilizer and surfactant are not required to create the necessary yield stress of the plug.

An example of a hydrocarbon based plug according to the invention includes the following components:

| | |
|---|---|
| Base Fluid: | Crude Oil, Refined Hydrocarbon |
| Gellent: | Phosphate Ester at 8-20 L/m³ |
| Crosslinker: | Metal solution of iron and aluminum at 8-20 L/m³ |
| Breaker: | pH breaker such as Magnesium Oxide run from 2-20 L/m³ |

The method described above can be used on a variety of wells. It can be used on vertical wells that require stimulations on multiple formations, on deviated wells, and on horizontal wells. The method can be used on wells that are open hole with no casing, on cased and cemented wells, or on wells with liners or casing in them that is not cemented in place. In this situation, a gel plug can be circulated on the inside of the casing as well as in the annular space between the casing and the formation.

The tubing that is used to pump the fluids through can be of any size that allows flow of fluid at a rate required to perform the designed stimulation. It can be coiled tubing or conventional jointed tubing. Common sizes of coiled tubing would be 50.8 mm, 60.3 mm, and 73 mm Common sizes of jointed tubing are 60.3 mm, 73 mm and 88.9 mm.

The stimulation and fracturing fluids can be any fluid including but not limited to water, salt water, hydrocarbon, acid, methanol, carbon dioxide, nitrogen, foam, and emulsions. The method is normally used when the fluid is pumped into the formation above fracturing pressure but can also be used when any of the above fluids are pumped into the formation below fracturing pressure.

The tubing or coiled tubing can either be pulled out of the well after the last fracturing treatment has been performed or run back to the bottom r the toe and can be used to circulate the broken plug from the well. Additional chemical can also be pumped at this time to enhance or accelerate the degradation of the gel plug.

A method according to the invention was used to fracture four sand stone formations at approximately 1,500-1,600 m true vertical depth. The well casing was 177.8 mm in diameter and was cemented in the wells to a measured depth of between 1,644-1,761 m measured depths. The casing was run through the vertical section of the well and was landed in the horizontal section of the well. The measured depths of the wells varied from 2,014 to 3,040 m. The horizontal portions of the wells varied from 370 to 1,332 m.

Below the casing, the wells were drilled to 159 mm diameter and left in an open hole state with no liners, casing or tubing in them. The temperature of the wells was approximately 70° C. The bottom hole pressure of the wells was 17,000 kPa.

Fracturing Design. The anticipated fracturing pressure in the wells was designed to be 37,000 kPa on surface and 26,000 kPa on bottom. A gel plug according to the invention was designed to withstand this pressure and to prevent flow of the gel plug into the formation and into the previously created fractures. The yield stress of the plug when combined with the annular fluid above the plug was designed to prevent the fracturing fluid and pressure at the formation from moving the plug during the fracturing treatments. The designed fracture rate was 2.5 m³/min and each well had a different number of intervals that needed to be fractured. Each well also had a different amount of sand that was to be placed in each interval.

The following method was used to fracture the well. 73.0 mm coiled tubing was fitted with the diverter tool of the type described above and was run in the wells to the end of the horizontal section (toe of the well). The hole was circulated to clay control water to ensure that it was full. Once returns of clay control water was seen at surface, gel fluid was pumped down the coiled tubing to bottom and was circulated in place from the toe of the well to 100 m inside the casing.

The gel consisted of:
Fresh Water
Guar Gum added at 48 kg/m³
Amine Clay Control Additive added at 2 L/m³
Borate Crosslinker added at 25 L/m³
Non Ionic Surfactant added at 2 L/m³

Figure 10:
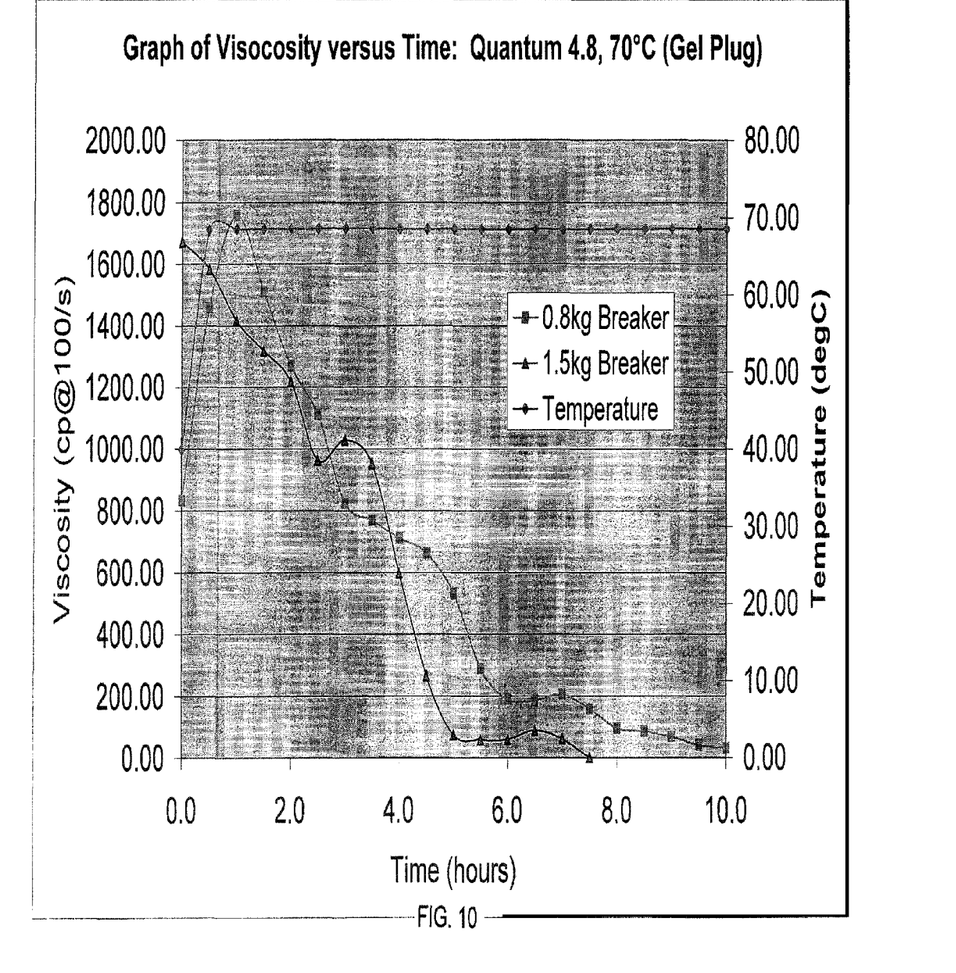
FIG. 10 is a graph of Viscosity versus Time for a gel plug according to the invention.

The properties of the fluid are set out m tables 1, 2 and 3 and the graph of FIG. 10.

TABLE 1

Power Law Data

| Time (hours) | n' | k' |
|---|---|---|
| 0.0 | −1.16 | 17127.03 |
| 0.5 | 0.35 | 28.59 |
| 1.0 | 0.70 | 6.91 |
| 1.5 | 0.58 | 10.36 |
| 2.0 | 0.06 | 94.76 |
| 2.5 | 0.30 | 27.30 |
| 3.0 | −0.15 | 161.66 |
| 3.5 | 0.54 | 6.34 |
| 4.0 | 0.26 | 21.68 |
| 4.5 | 0.43 | 8.95 |
| 5.0 | 0.14 | 27.39 |

K'units: (Newton * Sec^n)/m^2

TABLE 2

Gel Test Results

| | |
|---|---|
| Vortex Closure: | 2:00 (min:sec) |
| Crosslink Time: | 4:00 (min:sec) |
| Final pH: | 9.1 |

TABLE 3

Break Test Results

| Breaker: Potassium Persulfate Concentration | Temp; Break |
|---|---|
| 0.8 kg/m³ | 10:30 (hr:min) |
| 1.5 kg/m³ | 7:30 (hr:min) |

A delayed potassium persulfate chemical breaker was added to the gel plugs at 0.8 kg/m³ to reduce the viscosity of the plugs from high viscosity to that of water in about 6 to 12 hours. Each gel plug was designed to have high viscosity while the fracturing treatments were pumped and to degrade back to water within 2-4 hours after the last treatment was performed. As illustrated by FIG. 10, at a wellbore temperature of approximately 70° C. the viscosity of the gel plug peaks approximately 30 minutes after the gel is pumped into the wellbore. If the potassium persulfate concentration is at 0.8 kg/m$^3$, the viscosity of the gel plug will be reduced to that of water after approximately 10.5 hours. If the potassium persulfate concentration is at 1.5 kg/m$^3$, the viscosity of the gel plug will be reduced to that of water after approximately 7.5 hours.

After circulating the gel plug in place, the coiled tubing was positioned at the place where the first fracturing treatment was to be performed and operations were shut down for 15-30 minutes to allow for the gel plug to gain viscosity. The gel plug was displaced into the open hole section with fracturing fluid.

After waiting 15-30 minutes, the first fracturing treatment was performed. The sand was placed into the fracture that was created. The sand was displaced with fracturing fluid that was to be used on the next interval. During the fracturing treatment no pressure was added to the annulus and the annulus between the coiled tubing and the casing was monitored on surface to ensure that no pressure or fluid was being transmitted up the annulus.

After displacing the first fracturing treatment, the coil was immediately pulled back to the next fracturing interval and a second fracturing treatment was initiated.

This procedure was repeated until all the intervals in the wellbore were fractured. Up to 9 fractures were performed at various spots in each well. In each case, negligible pressure was seen on the annulus during the fracturing treatments indicating that the gel plug confined the fracture to the desired interval.

After the last fracturing treatment was completed, the coil was pulled from the wellbore and the well was shut-in to allow the gel plug and the fracturing fluid to break.

The well was then put on production. No significant amounts of sand was produced back or found in the wellbore which indicated that the gel plug successfully diverted the fracturing treatments into the desired interval.

We claim:

1. A method of isolating a zone in a formation to be fractured comprising the steps of:
    (a) first injecting a gel into a wellbore;
    (b) introducing a fracturing fluid into the gel; and
    (c) fracturing the formation in an area adjacent to the area of introduction of the fracturing fluid into the gel whereby the gel minimizes the migration of the fracturing fluid along the wellbore away from the area of the fracture.

2. The method according to claim 1, further including the step of permitting the gel to increase in viscosity prior to the fracturing step.

3. The method according to claim 2, wherein the gel forms a plug in the wellbore.

4. The method according to claim 3, including the step of introducing a fluid into the wellbore prior to injection of the gel.

5. The method according to claim 4, wherein the gel comprises a base fluid and a viscosifying agent.

6. The method according to claim 5, wherein the base fluid is water or hydrocarbon based.

7. The method according to claim 5, wherein the viscosifying agent is a viscosifying polymer or surfactant.

8. The method according to claim 5, wherein the viscosifying agent is guar, hydroxyl ethyl cellulose or derivatives thereof.

9. The method according to claim 5, wherein the gel includes a crosslinker.

10. The method according to claim 9, wherein the crosslinker is a multivalent metal ion.

11. The method according to claim 10, wherein the multivalent metal ion is borate, antimony, zirconium, chrome, titanium or iron.

12. The method according to claim 9, wherein the gel further includes one for more of a clay stabilizing, salt, methanol, pH adjustors, biocide and flowback enhancer.

13. The method according to claim 9, wherein the gel further includes a breaker.

14. The method according to claim 13, wherein the breaker is an enzyme or oxidizer.

15. The method according to claim 13, wherein the breaker is a persulfate, peroxide, or an acid.

16. The method according to claim 13 wherein the breaker is a pH buffer or caustic fluid.

17. The method according to claim 4 wherein the gel has a yield strength sufficient to minimize movement of fracturing fluid to another part of the well.

18. The method according to claim 1, wherein the gel does not enter the formation or any fractures formed in the formation.

19. The method according to claim 1, wherein the gel degrades and is removed from the wellbore after fracturing.

20. A method of isolating a zone in a formation to be fractured comprising the steps of:
    (a) inserting tubing into a wellbore to a first location in the wellbore;
    (b) introducing a gel into the wellbore via the tubing at the first location;
    (c) after step (b), introducing a fracturing fluid into the wellbore via the tubing to fracture the formation at the first location whereby the gel minimizes the migration of the fracturing fluid along the wellbore to isolate the fracture to the first location.

21. The method according to claim 20, further including the step of introducing a fluid into the wellbore prior to the injection of the gel.

22. The method according to claim 20, further including the step of permitting the gel to increase in viscosity.

23. The method according to claim 20, wherein the fracturing fluid is introduced into the gel.

24. The method according to claim 20, further including the step of moving the tubing to a second location and repeating step (c).

25. The method according to claim 24 further including the step of introducing additional gel prior to repeating step (c).

26. The method according to claim 20, wherein the gel does not substantially enter the formation or any fractures formed in the formation.

27. The method according to claim 20, wherein the gel degrades and is removed from the wellbore after fracturing.

* * * * *

UNITED STATES PATENT AND TRADEMARK OFFICE
CERTIFICATE OF CORRECTION

| | | |
|---|---|---|
| PATENT NO. | : 8,141,638 B2 | Page 1 of 1 |
| APPLICATION NO. | : 12/529661 | |
| DATED | : March 27, 2012 | |
| INVENTOR(S) | : Michael G. Tulissi et al. | |

It is certified that error appears in the above-identified patent and that said Letters Patent is hereby corrected as shown below:

Please replace field code (75) on the face of the patent (inventors) with the following to correct the spelling of the name of the city in which Michael G. Tulissi resides:

Inventors: Tulissi; Michael G., DeWinton (CA)
           Luk; Samuel, Calgary (CA)
           Vaughan; Jason, Calgary (CA)
           Browne; David J., Calgary (CA)
           Dusterhoft; Dale, Redwood Meadows (CA)

Signed and Sealed this
Fifth Day of June, 2012

David J. Kappos
*Director of the United States Patent and Trademark Office*